United States Patent [19]

Ohwada

[11] Patent Number: 4,656,581
[45] Date of Patent: Apr. 7, 1987

[54] VECTOR MASK CONTROL SYSTEM

[75] Inventor: Katsuaki Ohwada, Tokyo, Japan

[73] Assignee: NEC Corporation, Tokyo, Japan

[21] Appl. No.: 661,462

[22] Filed: Oct. 16, 1984

[30] Foreign Application Priority Data

Oct. 20, 1983 [JP]  Japan ............................... 58-196438

[51] Int. Cl.[4] .............................................. G06F 1/00
[52] U.S. Cl. .................................................... 364/200
[58] Field of Search ... 364/200 MS File, 900 MS File

[56] References Cited

U.S. PATENT DOCUMENTS 4,139,899  2/1979  Tulpule et al. ........................ 364/900

OTHER PUBLICATIONS

"Feasibility Study for a Numerical Aerodynamic Simulation Facility", Control Data Corporation, May 1979.

*Primary Examiner*—Raulfe B. Zache
*Attorney, Agent, or Firm*—Schwartz, Jeffery, Schwaab, Mack, Blumenthal & Evans

[57] ABSTRACT

A vector mask control system capable of processing both operand information and vector mask information associated with the operand information is provided. A vector data operating section and a shift register sequentially access the respective elements of the operand and vector mask information at the same time to thereby perform an operation on each of the operand elements accessed in association with the successive accessed elements of the vector mask information. The system further includes the capability to identify and validate a vector mask operation. Accordingly, there is no need for a separate vector mask identification subroutine.

5 Claims, 4 Drawing Figures

VECTOR MASK CONTROL SYSTEM

BACKGROUND OF THE INVENTION

This invention relates to a vector mask control system for performing vector mask operations in a vector processing apparatus which executes vector operations for scientific computation.

Generally, it seldom occurs in processing vector data or other massive data that all the elements of the data are valid ones which should be processed. Rather, these elements often comprise a mixture of data to be processed and data which need not be processed. In light of this, a system has been customarily employed which, while making reference to mask information associated with individual data elements of an operand, performs an operation control on individual the data elements of the operand associated therewith.

In the above-described type of data processing apparatus instructions are selectively executed in two different modes, i.e., one which makes reference to mask information and the other which does not. For a vector mask control system whose operation is based on whether or not to make reference to mask information, reference can be made to a publication entitled "FEASIBILITY STUDY FOR A NUMERICAL AERODYNAMIC SIMULATION/DESCRIPTION" published in May 1979 by CONTROL DATA CORPORATION. In the disclosed processor, a system is utilized in which an instruction word includes a particular field for indicating whether or not to make reference to mask data and either one of the two modes of instruction execution is selected depending on the content of the field when the instruction word is decoded.

Specifically, when reference to a mask, or a mask reference as will hereinafter referred to, is specified, a result of an operation on an operand is validated or invalidated depending on the value of mask information associated with respective elements of the operand; when a mask reference is not specified, the result of the operation is always valid. How such processing actually proceeds will be described in detail.

Referring to FIG. 1, assume that there is a program in which vectors A (I), B (I) and C (I) (I=element numbers 1~n) are defined and, when A (I) is larger than 0, C (I) should be obtained by C(I)=F ( A(I), B(I)) (where F(x,y) is any desired function) and, when A (I) is equal to or smaller than 0 C (I), it should not be obtained, and that in such a condition it is desired to use a generalized subroutine as a routine for obtaining C I). Then, the processing starts with identifying the content of A (I), which is one of elements of an operand, in response to an operand compare instruction at the main routine side. A vector mask M (I) is generated which is M (I)=1 if A (I) is larger than 0 and M (I)=0 if A (I) is equal to or smaller than 0. Subsequently, the subroutine is executed with reference made to the vector mask M (I) . At this instant, the subroutine itself is often unaware of the above-mentioned mask control for generalized application purposes. In such a case, the prior art system which specifies a mask reference in an instruction word cannot use the subroutine in its original condition. The result is the need for another subroutine which specifies a mask reference in an instruction word intended for a masked operation, inviting a significant reduction in efficiency. That is, the prior art system lacks flexibility since it has to be furnished with two different kinds of subroutines for accommodating a user's programs.

SUMMARY OF THE INVENTION

It is, therefore, an object of the present invention to provide a vector mask control system which makes it needless for a subroutine itself to be aware of a mask control and allows a flexible and efficient program to be developed and executed.

A vector mask control system of the present invention comprises: operand holding means for holding a plurality of operands each consisting of a plurality of elements; vector mask information holding means for holding vector mask information consisting of a plurality of elements associated with the respective elements of an operand; and vector mask operation instruction executing means for taking out the respective elements sequentially from said operand holding means and, at the same time, the elements of the vector mask information sequentially from said vector mask information holding means so as to perform an operation on each of the elements of the operand in association with the successive element of the vector mask information. The system further comprises: means for identifying an instruction intended for a vector mask operation when an instruction word is decoded; first operation indicating means for discriminating the validity of the vector mask operation specified by a given area of an instruction word under said identifying means and, thereby, indicating a vector mask operation; holding means for holding a mode which determines a valid or invalid state of the vector mask operation; second operation indicating means for indicating the vector mask operation in response to an output of said identifying means and a mode output from said holding means, and means for causing the vector instruction executing means to execute the vector mask operation in response to an output from said first or second operation indicating means.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
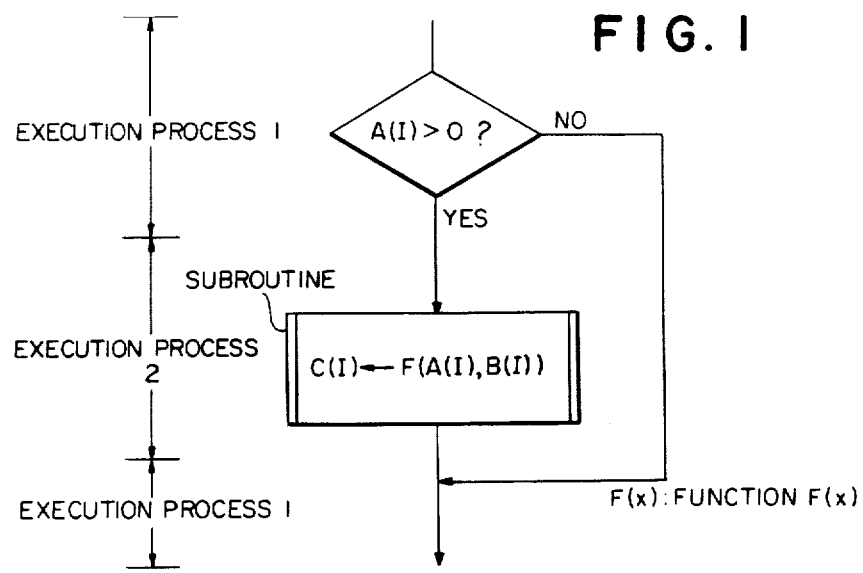
FIG. 1 is a flowchart for explaining the background of the invention.
Figure 2:
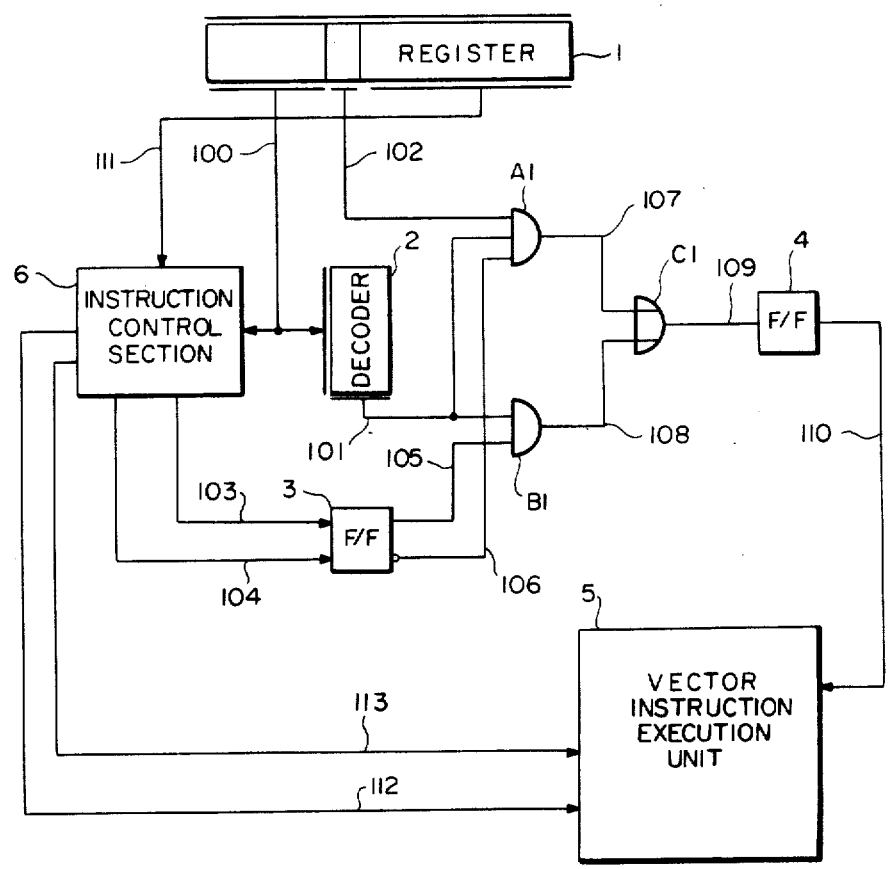
FIG. 2 is a block diagram of one embodiment of the invention.

Referring to FIG. 2, an embodiment of the invention comprises a register 1 for storing an instruction word to be executed, a decoder 2 for deciding whether or not an instruction specifies a masked operation, a mode flip-flop 3 for specifying a vector mask control system of a program under management by a process currently in execution, a vector instruction execution unit 5, a flip-flop 4 for issuing an instruction to the unit 5 for executing a masked operation, and an instruction control section 6 adapted for decoding an instruction word as well as for start-up processing.

A line 100 from the register 1 to the decoder 2 is for the transfer of an operation code. The decoder 2 serves to decode an operation code which is capable of effecting a predetermined masked operation. When the content delivered to the decoder 2 over the line 100 is an instruction capable of effecting a masked operation, the decoder 2 produces the result of the decoding on a line 101. When the content on the line 101 is logical "1", it shows that the instruction to be executed is intended for a masked operation. A line 102 is adapted to determine whether or not to actually validate the masked operation. A line 103 is a set signal line for setting the mode flip-flop 3 in response to an output of section 6 which is a fesult of decoding the operation code from the register 1 When the line 103 is logical "1", that is, when a set instruction for the flip-flop 3 has been executed, a line 105 becomes logical "1" and a line 106, logical "0". A line 104, on the other hand, is a reset line which resets the flip-flop 3 in response to another output from the section 6. When the line 104 is logical "1", that is, when a reset command for the flip-flop 3 has been executed, the line 105 becomes logical "0" and the line 106, logical "1". Whenever the instruction word to be executed is meant for a masked operation while the flip-flop 3 is logical "1", the execution unit 5 is instructed to execute the masked operation.

The lines 101, 102 and 106 are connected to an AND gate A1. The output 107 of the gate A1 becomes logical "1" under the conditions wherein the output of the flip-flop 3 is logical "0", the line 101 is logical "1" as a result of decoding, and the line 102 is logical "1", which indicates the masked operation is valid in the instruction word. Meanwhile, the lines 101 and 105 are connected to an AND gate B1. The output 108 of the gate B1 becomes logical "1" when the flip-flop 3 is logical "1" and the line 101 indicative of a result of decoding, logical "1". Further, the outputs 107 and 108 of the AND gates are connected to an OR gate C1. When either of the outputs 107 and 108 is logical "1", the output 109 of the OR gate C1 becomes logical "1". The flip-flop 4 functions to issue an instruction for causing the unit 5 to execute the masked vector operation. In response to logical "1" on the line 109, the flip-flop 4 applies a masked operation instruction to the unit 5 over a line 110. The instruction control section 6, in response to an operation code and additional information coming in over the lines 100 and 111, respectively, decodes an instruction word and controls start-up. When the instruction word is identified as a vector instruction, the instruction control section 6 instructs the execution unit 5 to start on the instructed operation over a line 112 while supplying thereto control data necessary for the operation over a line 113.

The vector instruction execution unit 5 in the embodiment comprises a unit capable of performing masked vector operations and constructed in a well known manner and, therefore, it will be described only briefly herein.

Figure 3:
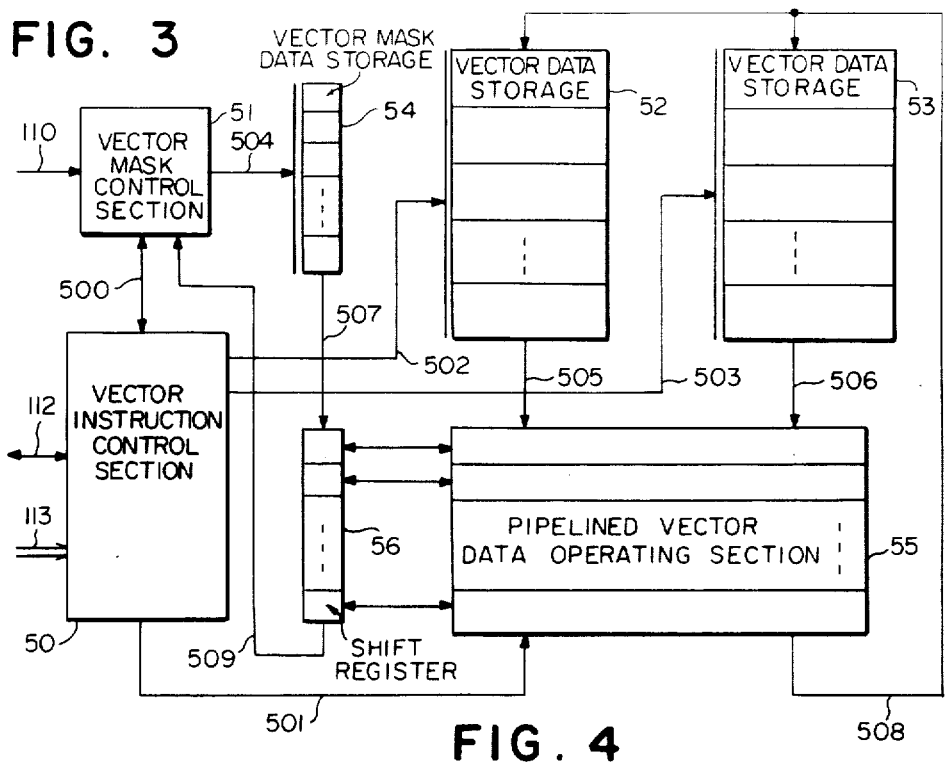
FIG. 3 is a block diagram of a part of FIG. 2.

Referring to FIG. 3, an exemplary construction of the execution unit 5 is shown. The unit 5 comprises a vector instruction control section 50, a vector mask control section 51, storage sections 52 and 53, each storing vector data which consists of a plurality of elements, a storage section 54 storing vector mask data associated with the respective elements of the vector data, a vector data operating section 55 having a pipeline construction for sequentially performing operations on vector data read out of the storage sections 52 and 53, and a shift register 56 for holding the successive vector masks read out of the section 54 in association with each stage of the pipeline of the section 55.

Now, the procedure of a masked vector operation will be briefly presented.

The instruction control section 6 triggers the execution of a vector instruction over the line 112. At the same time, the section 6 supplies control data necessary for the execution of the instruction to the control section 50 over the line 113, while the flip-flop 4 informs the control section 51 of the designation of the masked operation over the line 110.

In response to the execution instruction, the vector instruction control section 50 decodes the control data coming in through the line 113 and, thereby, delivers addresses and read instructions to the storage sections 52 and 53 over lines 502 and 503, respectively. Also, the control section 50 applies a vector mask read instruction to the vector mask control section 51 over a line 500 and, in turn, the control section 51 delivers an address and a read instruction to the storage section 54 over a line 504. Further, the control section 50 applies an operation instruction to the operating section 55 over a line 501. The vector data read out of the storage sections 52 and 53 are sequentially routed to the operating section 55 via lines 505 and 506, respectively, so as to be processed while passing through the pipeline as specified by the operation mode. The vector operation results are fed out to the storage sections 52 and 53. Meanwhile, the vector mask data sequentially read out of the storage section 54 are transferred to the shift register 56 over a line 507 to be sequentially shifted therein in synchronism with the operation of the pipeline. Timed to the delivery of vector results, vector masks associated with the vector results are fed to the control section 51 via a line 509. The control section 51, depending upon the content of the incoming successive vector mask, informs the control section 50 of whether or not the results can be stored in the storage section 52 and 53 over the line 500. That is, when the content of a vector mask has a valid value, i.e., "1", an address and a write instruction are fed over the signal line 502 or 503. When it has an invalid value, on the other hand, i.e., "0", the write instruction is suppressed via the line 502 or 503.

By the above procedure, the masked vector operation is executed.

The embodiment will further be described in conjunction with a program by way of example.

When the flip-flop 3 is logical "0" in conjunction with a program to be executed, the execution of the masked vector operation depends on the value of the specific field of the instruction word which indicates validity of the masked vector operation. That is, assuming that at the time of decoding an instruction word an operation code is determined by the decoder 2 to be intended for a masked vector operation and the masked operation validity field to be logical "1", then all the lines 101, 102 and 106 are logical "1" and so is the line 107. In this condition, the set signal line 109 associated with the flip-flop 4 is logical "1" to make the flip-flop 4 logical "1" with the result that an instruction for the masked vector operation is applied to the vector instruction execution unit over the line 110.

Figure 4:
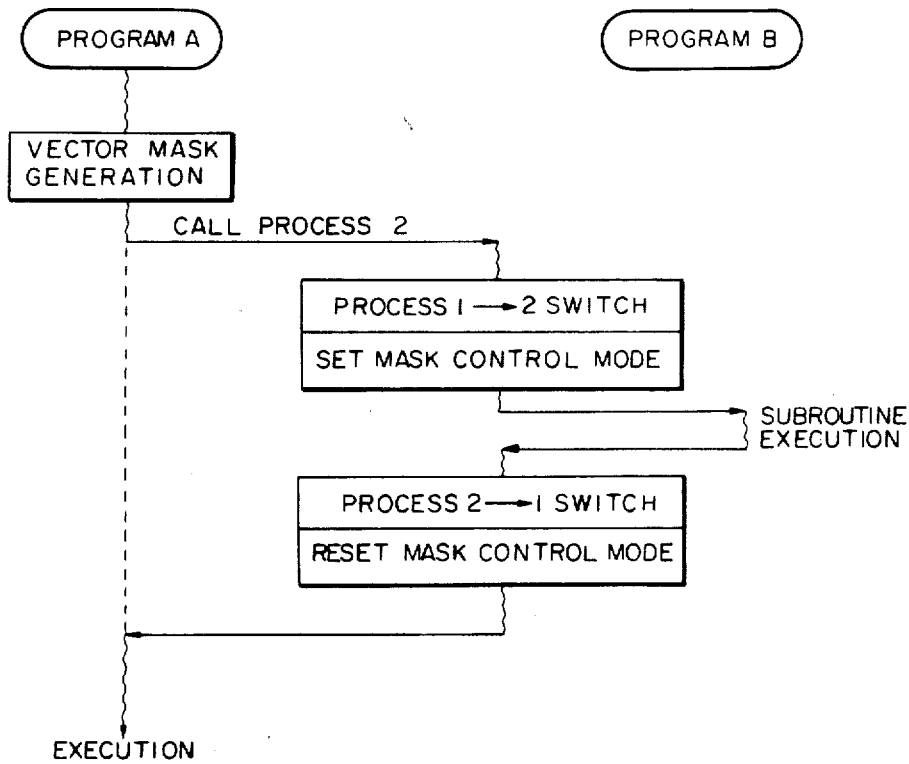
FIG. 4 demonstrates the operation of the embodiment of FIG. 2.

Meanwhile, under the condition wherein a program routine to be executed is of the kind which is programmed as a subroutine and, therefore, a mask control is not specified in an instruction word, it is sometimes desired to cause the subroutine to be executed while effecting. mask reference. For example, it may be desired to execute a subroutine of a program B which is managed by a process 2 by generating mask information and making reference to the mask information by the execution of a program A which is controlled by a process 1. Assuming a case wherein the subroutine is one for computing a certain function F ( A (I), B (I)) for two vectors data A(I) and B (I) (I=1~n) to produce vector C (I), the vector C (I) is kept as it is when mask information M (I) IS "0" and C (I)=F ( A (I), B (I)) is executed only when M (I) is "1". Then, by setting the flip-flop 3 to logical "1" at the time of a switch from the process 1 to the process 2 prior to the execution of the subroutine (as shown in FIG. 4), it is possible to cause a mask operation when executing an instruction even if the validity of the mask operation is not specified in the instruction word. Upon switching of the process from 2 to 1, which occurs when the operation returns to the program A after the subroutine, the flipflop 3 will be reset to allow the rest of the program to be executed while determining the masked vector operation depending on the value of the masked operation validity field of an instruction word.

In the above-described manner, the subroutine B, without the need for being aware of a mask reference itself, can be mask-controlled under the control of the flip-flop 3 during execution.

In summary, it will be seen that the present invention achieves the development and execution of programs which allows unprecedented flexibility and efficiency.

What is claimed is:

1. A vector mask control system comprising:
   A. a vector instruction executing means comprising:
      (1) operand holding means for holding a plurality of operands each comprising a plurality of elements;
      (2) vector mask information holding means connected to said operand holding means for holding vector mask information comprising a plurality of elements associated with respective elements of the operands; and
      (3) vector mask operation instruction executing means connected to said operand holding means and said vector mask information holding means for accessing respective elements of an operand sequentially from said operand holding means and, at the same time, accessing the elements of the respective vector mask information sequentially from said vector mask information holding means so as to perform an operation on each of the elements of the accessed operand in association with the successive accessed elements of the vector mask information;
   B. identifying means for identifying an instruction intended for a vector mask operation;
   C. first operation indicating means connected to said identifying means for indicating validity of a vector mask operation specified by a given area of an instruction identified by said identifying means and, thereby, commanding a vector mask operation;
   D. holding means for holding a mode indicator which indicates a valid or invalid state of a vector mask operation;
   E. second operation indicating means connected to said identifying means and said holding means for indicating a valid vector mask operation in response to an output from said identifying means, and a mode indicator output from said holding means; and
   F. means for causing the vector instruction executing means connected to said first and second operation indicating means to execute the vector mask operation in response to an output from said first or second operation indicating means.

2. A system as claimed in claim 1 including means for holding an instruction code, said instruction code including an operation code, and wherein said identifying means comprises a decoder for receiving said operation code and determining whether a masked operation is specified by said received operation code.

3. A system as claimed in claim 2 further wherein said instruction code includes an instruction word, and further comprising means for decoding said instruction word, and wherein said identifying means and said means for decoding said instruction word operate substantially simultaneously such that the instruction word and operation code of an instruction code are decoded at the same time.

4. A system as claimed in claim 1 wherein said holding means comprises a bi-stable circuit.

5. A system as claimed in claim 2 wherein said second operation indicating means comprises a logic gate receiving a binary output signal from said decoder and a binary output signal from said identifying means.

* * * * *